United States Patent Office 3,666,410
Patented May 30, 1972

3,666,410
METHOD FOR THE CONTINUOUS CRYSTALLIZATION OF SODIUM MONOSULFIDE ESSENTIALLY AS $Na_2S.5H_2O$
Yoshio Aoyama, 37 Chayamachi, Osaka, Japan; Nobuyuki Mikasa, 20–1 Aza Minamiikeda, Kawamo, Takarazuka, Japan; and Shuuzo Nakatani, 4233 Mitsu, Akitsumachi, Hiroshima Prefecture, Japan
Continuation-in-part of application Ser. No. 677,384, Oct. 23, 1967. This application Dec. 3, 1969, Ser. No. 881,908
Claims priority, application Japan, Oct. 25, 1966, 41/70,524
Int. Cl. C01b 17/22
U.S. Cl. 23—134
3 Claims

ABSTRACT OF THE DISCLOSURE

Crystalline $Na_2S.XH_2O$, in which X is 6 or less, of high purity and large grain size, is produced continuously by establishing a circulation of aqueous mother liquor through a crystallizing zone and a reaction zone, which circulation always has a concentration of $Na_2S$, based on the water, in excess of 35% by weight, and a temperature in excess of 46° C. In the reaction zone the temperature is kept enough above 46° C. to keep crystals from forming. On the way to the crystallizing zone the liquor is cooled to a temperature close enough to 46° C. to supersaturate it, but is introduced into the crystallizer, where crystals are already present, during the short time lag before crystals commence to form. Form the top of the crystallizer most of the spent mother liquor is returned to the reaction zone, the remainder being removed with the crystals from the bottom of the crystallizer. The make-up of pure $Na_2S$ solution is provided by reacting equimolar amounts of NaOH and NaHS in the reaction zone with the required amount of additional water. The heat of this reaction, with or without further heat, is employed in raising the temperature in the reaction zone to keep crystals from forming there. To restrict water of crystallization in the crystals to 5.5 or 5.0 moles, the process is operated at concentrations of $Na_2S$, based on the water, in excess of 40% and 43%, by weight, respectively, and at temperatures in excess of 50° C. and 52° C., respectively.

CROSS-REFERENCE TO RELATED APPLICATION

This application is a continuation-in-part of application Ser. No. 677,384, filed Oct. 23, 1967, now abandoned.

SUMMARY OF THE INVENTION

This invention relates to improvements in the preparation of crystalline sodium monosulfide (class 23 subclass 134) by continuous crystallization, and resides in the novel combinations of features hereinafter set forth and more particularly pointed out in the appended claims, which contribute to the continuous production in mass quantities of a crystalline product having uniform and large sized grains with high purity and low deliquescence.

There are conventionally three crystalline forms of sodiummonosulfide, that is, $Na_2S.9H_2O$, $Na_2S.6H_2O$, and $Na_2S.5½H_2O$. In addition, there is another crystalline form of sodiummonosulfide, that is, $Na_2S.5H_2O$ newly discovered by the inventors. The saturation or solubility curve of sodiummonosulfide is commonly expressed in percentage weight density, i.e. in parts $Na_2S$ per 100 parts of water by weight (see Handbook of Chemistry & Physics, 45th Ed., The Chemical Rubber Co., 1964, page B–225). The complete curve (FIG. 1 herein) reveals that there are three transition points along the curve; from $Na_2S.9H_2O$ to $Na_2S.6H_2O$ at 46° C. of liquid temperature and 35% of weight density, from $Na_2S.9H_2O$ to $$Na_2S.5½H_2O$$

at 50° C. and 40%, and from $Na_2S.9H_2O$ to $Na_2S.5H_2O$ at 52° C. and 43%, respectively.

It is a well-known practice to produce crystalline sodiummonosulfide industrially by roasting and reducing a mixture of Glauber's salt and coal powder at approximately 1000° C., dissolving the compound in water, and crystallizing sodiummonosulfide from the aqueous solution, the density of which is usually 20 to 25% in terms of weight percentage. In this case therefore it is required to cool the aqueous solution down into the range of 25 to 20 C. to cause crystallization of solute from the aqueous solution. By this known method sodiummonosulfide is crystallized from the aqueous solution in the form of $Na_2S.9H_2O$ which has the highest deliquescence among the above-mentioned four forms of crystallizations, thus causing considerable inconvenience in storage and transportation following production. In addition, the sodiummonosulfide produced by this method is in practice apt to contain much foreign matter due to the impure nature of the raw material.

Recently there has been an attempt to improve the product obtained by the above-described method. In this attempt, the product of $Na_2S.9H_2O$ is re-dissolved in water, filtered, raised to above 35% weight density by evaporation, and crystallized in the form of $Na_2S.6H_2O$ or $Na_2S.5½H_2O$ at a temperature over 46° C. in a batch-type operation. Though this secondary form of crystalline product is lower in deliquescence, this recent attempt involves disadvantages in that it requires complicated production processes and apparatus and substantial amounts of heat for re-dissolution and evaporation, resulting in an uneconomic increase of production cost. In addition, the product grains produced in this recent attempt are sized as small as 1 to 2 millimeters in average diameter with considerable variation, and so have exposed to atmosphere a large surface area per unit of weight; in other words, they are not yet as low in deliquescence as is desirable from the commercial standpoint.

The general method of the present invention is a saturating one in which sodium hydrogensulfide and sodium hydroxide are reacted into sodiummonosulfide

in a circulation of mother liquid, the liquid containing the newly prouced sodiummonosulfide being then cooled from the non-saturated state into a saturated state, and the sodiummonosulfide being continuously crystallized therefrom essentially in the form of $Na_2S.5H_2O$.

It can generally be said that liquid saturated with a soluble substance begins to yield fine kernel grains in it a while after it is cooled down into the saturated state. A series of experiments carried out by the inventors reveals that the time lag from the cooling to the yielding may be determined by the initial standing of liquid in relation to the saturation curve, given the density of liquid in terms of weight percentage. In other words, the time lag is definitely longer in case the cooling is initiated under the saturation curve (that is, from a non-saturated state) than if it is initiated above the saturation curve (that is, from a saturated state), for a given density of the liquid solution. Indeed, the saturation curve may be the critical line to prolong the time lag existing between the cooling of the aqueous solution toward a saturated state and the yielding of kernel grains in the saturated state. And in fact the inventors have succeeded in restraining sufficiently the occurrence of kernel grains in the mother liquid before it is poured into a crystallizer provided in the circulation system, by cooling the liquid across the saturation curve from the non-saturation side back to the saturation side following a previous crossing over of the saturation curve from the saturated side to the unsaturated side. By this practice the inventors have succeeded in producing sufficiently uniform and large-sized grains of sodiummonosulfide continuously in the crystallizer, for grains do not grow to be sufficiently uniform and large-sized in the crystallizer if the occurrence of kernel grains is not restrained sufficiently before the mother liquid is poured into the crystallizer.

A principal object of the invention is to obtain sufficiently uniform and large-sized crystalline sodiummonosulfide with sufficiently high purity and low deliquescence continuously from sodium hydrogensulfide and sodium hydroxide in a circulation system of mother liquid.

A more specific object of the invention is to restrain the occurrence of kernel grains sufficiently before the mother liquid with added sodium hydrogensulfide and sodium hydroxide is poured into a crystallizer provided in said circulation system, by cooling the liquid across the saturation curve from the non-saturation side back to the saturation side following the pre-crossing over of the saturation curve to the non-saturation side.

Another specific object of the invention is to utilize the reaction heat of sodium hydrogensulfide and sodium hydroxide for raising the temperature of liquid in said pre-crossing over of the saturation curve in the range to crystallize sodiummonosulfide essentially in the form of $Na_2S.5H_2O$.

FIG. 1 is the saturation or solubility curve of sodium-monosulfide dissolved in and crystallized from water solution at different concentrations and temperatures in the range between its solubility in water at 10° C. (about 15 weight percent $Na_2S/H_2O$) and its solubility in water at 90° C. (about 60 weight percent $Na_2S/H_2O$), and showing the content of water of crystallization of the solid products involved, the horizontal scale representing temperature and the vertical scale representing density. (Basis: legends on FIG. 1.)

Figure 2:
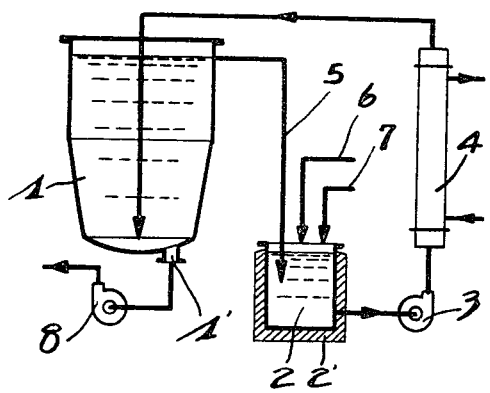
FIG. 2 is a diagrammatic view, in vertical elevation, of a circulation system of mother liquid in which the principle of the invention may be carried out.

Initially, the inventors arranged the circulation system of FIG. 2 on a small experimental scale. This system primarily comprises a crystallizer 1, a cooler 4, a reactor 2 intermediate the crystallizer 1 and the cooler 4, a circulation pump 3 intermediate the cooler 4 and the reactor 2, and a slurry pump 8 at the delivery side of crystallizer 1. These five elements of the circulation system are piped as shown in FIG. 2. The crystallizer 1 is provided with a delivery port 1' at the bottom. The reactor 2 is provided with a heat insulation 2' around itself.

Figure 3:
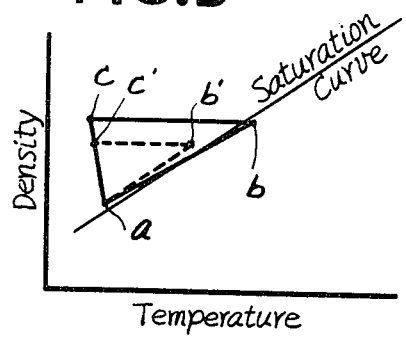
FIG. 3 is a process diagram for the crystallization of sodiummonosulfide in the circulation system of FIG. 2, wherein the density and temperature values of points ($a$), ($b$), ($c$), etc. conform to a set of such values taken from FIG. 1, and related to the curve $Na_2S.5H_2O$ therein, in accordance with the prinicples of the invention, as hereinafter more fully described.

In the operation of such a circulation system, the mother liquid overflowing from the upper region of the crystallizer 1 is a saturated solution having the density and concentration indicated by point $a$ in FIG. 3, and is brought into the reactor 2 by way of a pipe 5, while equimolar amounts of sodium hydrogensulfide and sodium hydroxide in aqueous solutions of appropriate density are supplied at the same time into the reactor 2 by way of pipes 6 and 7, respectively. After being mixed and reacted and heated from condition $a$ to condition $b$ in the reactor 2, the liquid is an unsaturated solution as indicated at point $b$ in FIG. 3 and is circulated into the crystallizer 1 by way of the cooler 4 by the action of pump 3. The liquid solution, which is unsaturated in the reaction zone 2, is cooled sufficiently to bring it into a super-saturated state in cooler 4 as indicated by the line $b-c$ in FIG. 3. The resulting super-saturated solution during the interval of time lag above mentioned is delivered into the lower region of the upflow crystallizer 1 where crystals are already growing, and thus tends to yield sufficiently uniform and large-sized crystalline sodiummonosulfide as it flows upwardly in the crystallizer 2 wherein it returns to the condition indicated by point $a$ in FIG. 3. The yielded product sinks down to the bottom of crystallizer 2 by its own gravity and finally is taken out of it through the port 1' by the action of pump 8. The aqueous liquid which has been diluted by outputting the solute in the crystallized form (e.g. $Na_2S.6H_2O$ having about 72 parts $Na_2S$ per 100 of water is crystallized from a solution having about 35 to 40 parts $Na_2S$ per 100 of water, thus depleting the solution in $Na_2S$) goes further upward and overflows from the upper region of the crystallizer 1 back into the reactor 2 by way of the pipe 5. In fact, in the experimental-scale operation of this system, the inventors obtained uniform grains sized approximately 3 millimeters in diameter continuously.

Then, the inventors scaled up the experimental system of FIG. 2 for pilot plant production. However, this large-scale system, after a while of running, did not restrain the occurrence of fine kernel grains, say, 0.5 millimeter or smaller in diameter, before the liquid is poured into the crystallizer 1. Accordingly, the yielded product was grained neither sufficiently uniform nor larger than 2 millimeter in diameter. Various modifications of operational condition did not improve the product at all.

The above-described unsatisfactory result of scaled-up production required the inventors to analyze the crystallization process, as diagrammatically explained in FIG. 3.

In a small-scale experiment with such a circulation system as shown in FIG. 2, according to this analysis sodium-monosulfide will be crystallized in a process illustrated in dark lines $abca$ in FIG. 3. The circulating liquid delivered by pipe 5, FIG. 2, is supposed to be initially at the saturated state $a$. As sodium hydrogensulfide and sodium hydroxide are mixed and reacted in the mother liquid within the reactor 2, the liquid will be warmed up to the nonsaturated state $b$ across the saturation curve by the ultilization of reaction heat generated in the insulated reactor 2 while the materials are continuously mixed and reacted there; in this case, the insulated reaction heat must be sufficient to warm the liquid up to the state $b$. Next, in the cooler 4 the liquid will be cooled down to the saturated state $c$ across the saturation curve again, but reversely. After the period of time lag, during which it is poured into the crystallizer 1, the liquid will begin to have the solute crystallized in the crystallizer 1. Having released the solute in the crystallizer 1, the liquid will overflow from the crystallizer 1 back into the reactor 2, where it will be again in the state $a$.

So far everything is satisfactory in the small-scale experiment. But according to the present inventors' analysis in a large-scale production with such a circulation system as shown in FIG. 2, sodiummonosulfide will be crystallized in a process illustrated in dotted lines $ab'c'a$ in FIG. 3. Here the circulating liquid is also supposed to be initially at the saturated state $a$ similarly. But then in the large scale production the liquid will be warmed not to the non-saturated state $b$ across the saturation curve but to the still saturated state $b'$ by the utilization of insulated reaction heat in the reactor 2 while the materials are continuously mixed and reacted there; in this case, according to the inventors' analysis the insulated reaction heat must be insufficient to warm the liquid up to the state $b$ across the saturation curve to its unsaturated side. This may be so because of greater heat loss and/or because in the large-scale production a comparatively large rate of diluted flow is required to be supplied into the reactor 2 from the crystallizer 1 by way of the pipe 5 to dilute the liquid introduced via pipes 6 and 7 so much that it may not permit fine kernel grains to occur prior to its entrance into the crystallizer 1 in spite of the circulation velocity and pumping vibration which are substantially much more influential in a large-scale production than in a small-scale experiment. Having been heated only to point $b'$ in the cooler 4 the liquid will be cooled down only from the saturated state $b'$ to the saturated state $c'$ without crossing of the saturation curve. After a while of time lag the liquid will begin to have the solute crystallized; in this case, however, the time lag cannot be sufficient for the liquid to be poured fully into the crystallizer 1 since the cooling was initiated above the saturation curve, in other words, fine kernel grains must be occurring considerably before the liquid is poured fully into the crystallizer. Therefore the yielded product cannot be grained uniform and large-sized sufficiently. In conclusion, it appears indispensable to obtain satisfactory grains of sodiummonosulfide that the liquid be cooled across the saturation curve from the non-saturated side to the saturated side before it is poured into the crystallizer.

Figure 4:
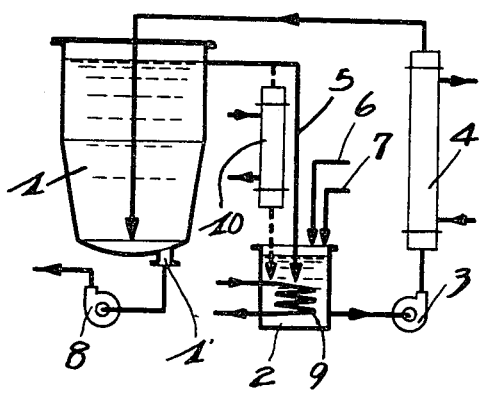
FIG. 4 is a diagrammatic view in vertical elevation of another circulation system of mother liquid in which the principle of the invention may be carried out.

Based on the above-described hypothesis, the inventors modified the circulation system of FIG. 2 into that shown in FIG. 4. This system is provided with a heating coil 9 in place of the heat insulator 2' of the system shown in FIG. 2. Steam may be used through the coil 9 to heat the liquid positively in the reactor 2. The liquid is circulated quite similarly to the system shown in FIG. 2.

Figure 5:
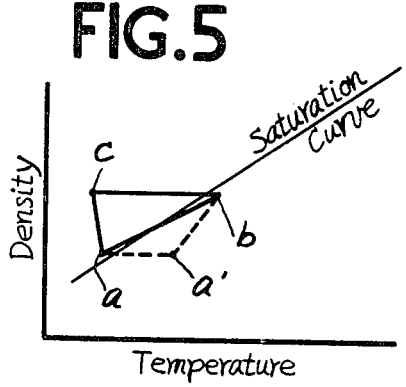
FIG. 5 is a process diagram for the crystallization of sodiummonosulfide in the circulation system of FIG. 4, wherein the density and temperature values of points ($a$), ($b$), ($c$), etc. conform to a set of such values taken from FIG. 1, and related to the curve $Na_2S.5H_2O$ therein, in accordance with the principles of the invention, as hereinafter more fully described.

In such a circulation system as shown in FIG. 4, sodiummonosulfide will be crystallized in a process illustrated in dark lines $abca$ in FIG. 5. The liquid will be warmed from the saturated state $a$ up to the non-saturated state $b$ without fail across the saturation curve by the utilization of reaction heat plus the positive heat of coil 9 in the reactor 2 while sodium hydrogensulfide and sodium hydroxide aqueous solutions are mixed and reacted continuously in the mother liquid there, the total heat available being sufficient to warm the liquid up to the state $b$ for any flow rate of diluted liquid supplied from the crystallizer 1 into the reactor 2. The liquid will then be cooled in the cooler 4 down to the saturated state $c$ across the saturation curve again but reversely. Since the cooling is initiated under the saturation curve, there can be a sufficient time lag from the cooling of liquid to the yielding of crystalline sodiummonosulfide. Thus the occurrence of kernel grains will be restrained sufficiently before the liquid is poured into the crystallizer 1 in this circulation system, irrespective of increase in the flow rate of diluted mother liquid supplied from the crystallizer 1 into the reactor 2; the undesirable effect of increased heat loss and/or of such increase in the diluted flow rate can be cancelled by a corresponding increase in the heating capacity of coil 9 together with a corresponding increase in the supply rate of materials through the pipes 6 and 7. As a result of the sufficient time lag, the liquid will be poured fully into the crystallizer in the sufficiently saturated state $c$, and it will have the solute crystallized in sufficiently uniform and large-sized grains as it goes upward in the crystallizer 1 until it overflows back into the reactor 2, where it will be again in the state $a$.

In fact, the inventors obtained sufficiently uniform and large-sized grains, say, 5 millimeters in diameter, of sodiummonosulfide in the forms containing less crystalline water and negligible foreign matter continuously in mass quantity in a large-scale circulation system as shown in FIG. 4.

It may be as good to replace the heating coil 9 with a heater 10 in FIG. 4. In this case, the mother liquid is heated sufficiently before it is returned back into the reactor 2. Then the crystallization process will be such as illustrated in dotted line $aa'bca$ in FIG. 5. Here the liquids will be heated from the state $a$ to the state $a'$ across the saturation curve without increasing the density before it enters into the reactor 2. Then the liquid will gain both in density and in temperature in the reactor 2 while the materials supplied through the pipes 6 and 7 are mixed and reacted there, until it is brought up to the non-saturated state $b$.

It may still be as good to replace the heater 10 with a heating evaporator for the similar purpose to bring the liquid into the non-saturated state $b$ prior to the cooling for crystallization. This replacement will especially be useful for a low-density supply of the aqueous sodium hydrogensulfide and sodium hydroxide through the pipes 6 and 7.

Figure 1:
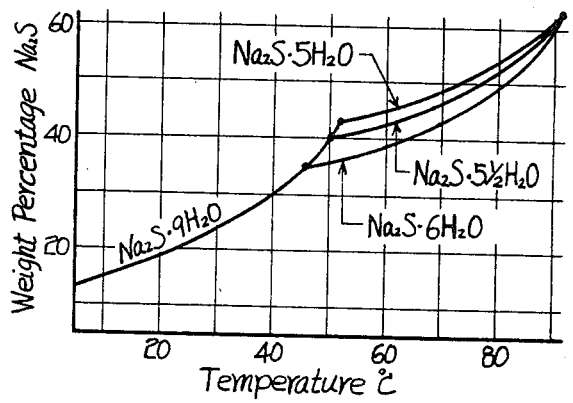

Referring to the saturation curve of FIG. 1, $Na_2S \cdot 5H_2O$ is crystallized in case the liquid is cooled to a supersaturated condition across the section of the curve corresponding to $Na_2S \cdot 5H_2O$ where the weight density of $Na_2S$ exceeds 43% and the temperature exceeds 52° C. If the cooling to a supersaturated state is effected across the somewhat lower curve section designated $Na_2S \cdot 5\frac{1}{2}H_2O$, that crystal form results. If the cooling to such state occurs across the somewhat lower curve section bearing the legend $Na_2S \cdot 6H_2O$, the crystals formed are correspondingly hydrated. If the cooling and crystallization are effected across two or three of said curve sections, then mixtures of the corresponding crystal forms are obtained. Since in each of these instances the liquid is cooled across the saturation curve from the non-saturation side to the saturation side in the relatively high temperature range and then transferred promptly to the crystallizer, sodiummonosulfide is crystallized in relatively uniform and large-sized grains in said forms with correspondingly low deliquescence in accordance with the invention; not only less water is crystallized in the grains but also large size of grain minimizes the surface area per unit weight of grain exposed to atmosphere.

The several embodiments of process just described represent best modes of practicing the invention, depending on the particular crystal form, or forms, desired to be produced. Correlating the same with FIG. 1, these examples may be typified by more fully setting out the first thereof (which is believed to produce the most desirable product) as follows:

Example 1.—Production of $Na_2S \cdot 5H_2O$

Employ the apparatus of FIG. 4, and the operating conditions of FIG. 5, applied to some part of the $Na_2S \cdot 5H_2O$ solution curve of FIG. 1, at which the water content of the solution at point $c$ is greater than the proportion of water in the crystals, so that the crystallization will dilute the mother liquid as above stated. Since the weight percentage $Na_2S$ of the crystalline $Na_2S \cdot 5H_2O$, based on the water, is 78/90 or over 86%, and the transition point on the curve of FIG. 1 from $Na_2S \cdot 9H_2O$ to $Na_2S \cdot 5H_2O$ as above noted in 43% (same basis), crystallization anywhere above 43% (same basis) is appropriate. So for this typical eaxmple, take values of $c$ and $a$ in FIG. 5 of 46.4% and 46.3%, respectively.

The 46.4% line crosses the saturation curve of $Na_2S \cdot 5H_2O$ (FIG. 1) at 60.5° C., i.e. a 46.4% solution is unsaturated a little above this temperature and supersaturated a bit below this temperature. The 46.3% line crosses the saturation curve of $Na_2S \cdot 5H_2O$ (FIG. 1) at 60.1° C., i.e. the 46.3% mother liquor at point $a$ FIG. 5, should have a temperature lower than 60.1° C. to remain saturated as shown in FIG. 3, and since there is some heat of crystallization liberated in the crystallizer, the temperature at $c$, FIG. 5, should be low enough so that the point $a$ will remain below 60.1° C. Therefore, according to the above teachings, for this typical example we take values at $a$, $b$ and $c$ (FIG. 5) of 46.3%/about 60.0° C., 46.4%/60.7° C. and 46.4%/59.8° C., respectively.

With the apparatus according to FIG. 5 in which an amount of 46.4% solution containing 464 grams of $Na_2S$ is fed to the crystallizer 1 in a given time period, and reduced to 46.3% solution therein, the crystals formed in that time period will contain 1.0 gram of $Na_2S$, and having the composition $Na_2S \cdot 5H_2O$ will contain (1.0) (90/78) or 1.15 grams water of crystallization, a total of 2.15 grams of crystal grains in the time period. Allowing an equal weight of $Na_2S$ as 46.4% solution (based on the water) to be drawn off with the 2.15 grams of crystals through the slurry pump 8 in such time period, for the continuous operation above described there must be supplied to reactor 2 enough NaOH and NaHS to form 2.0 grams of $Na_2S$ in the time period, with the appropriate quantity of water to restore the 46.4% weight density of the solution, viz: 1.05 grams of NaOH and 1.44 grams of NaHS. The reaction of these materials produces not only the required 2.0 grams of $Na_2S$ but also 0.46 gram of the required make-up water. But the total make-up water required is 3.31 grams (i.e. 1.15 grams of water of crystallization and 2.16 grams in the solution pumped out), and as the reaction yields only 0.46 gram of this, an additional 2.85 grams of make-up water must be added in the reactor 2 in the time period along with the reactants.

Having thus pre-determined the conditions to be in essence conformed to, a solution of 46.4% $Na_2S$ (based on the water) is made up in the reactor 2 from materials supplied by way of pipes 6 and 7 at a temperature enough above 60.7° C. to enable circulation to be established via pump 3 and pipe 5. Cooling of the cooler 4 is then commenced at a rate such that the 46.4% solution delivered to the crystallizer 1 has a temperature of 59.8° C., and as crystals begin to form in the crystallizer they and a flow of solution are withdrawn by pump 8 and like quantities of make-up materials are supplied through pipes 6 and 7, the circulation rate of pump 3 and the heating and cooling in coil 9 and cooler 4 being adjusted to establish and maintain the above-mentioned predetermined conditions.

Since the materials sodium hydrogensulfide and sodium hydroxide are usually available with minimal foreign matter in them, the yielded product is essentially free of foreign matter and therefore of high purity in accordance with the invention.

Because the high purity solution delivered by pump 3 is unsaturated and is cooled across the saturation line in cooler 4 and immediately delivered to the crystallizer 1, formation of fine crystals is minimized and crystals of high purity and relatively large and uniform grain sizes are obtained continuously, and as there is a continuous inflow of make-up materials through pipes 6 and 7 and a continuous out-flow of slurry through pump 8, no substantial build-up of impurities in the system occurs even over prolonged periods of operation.

Since the reaction heat is utilized in raising the temperature of the solution into a non-saturated state, the total heating cost is kept quite economical in accordance with the invention. Moreover, the purchase and installation costs of the system are also low because the circulation system is prepared and arranged in a simple manner.

Other examples

By applying the operating conditions determined according to FIG. 1 and FIG. 5 to the appropriate one or ones of the curves for $Na_2S.5H_2O$, $Na_2S.5\frac{1}{2}H_2O$, and/or $Na_2S.6H_2O$, as above typified, crystals of corresponding degrees of hydration and of high purity and relatively uniform large grain size can readily be produced by one skilled in the art guided by the foregoing disclosure.

It will thus be seen that by the improved method of the invention sodiummonosulfide is crystallized in uniform and large-sized grains with high purity and low deliquescence continuously in mass quantity at low cost.

What is claimed is:

1. A method for continuously producing crystalline sodium monosulfide consisting essentially of $Na_2S.5H_2O$ of high purity and large grain size, which comprises the steps of:
    (a) establishing a circulation of mother liquor from a reaction zone wherein it is restored in volume and concentration, through a crystallizing zone wherein it is depleted in volume and concentration by crystallization, and then returning the depleted mother liquor to said reaction zone, said mother liquor consisting essentially of a solution of sodium monosulfide in water,
    (b) maintaining in the mother liquor in said crystallizing zone and throughout said circulation concentrations of sodium monosulfide in excess of a lower concentration limit of 43%, by weight, based on the water, and temperatures in excess of a lower temperature limit of 52° C.,
    (c) maintaining the sodium monosulfide concentration of said solution passing to said crystallizing zone sufficiently higher than said lower concentration limit, and maintaining the temperatures of said solution in said crystallizing zone sufficiently near said lower temperature limit, to render said solution supersaturated in sodium monosulfide with respect to $Na_2S.5H_2O$ throughout its passage through said crystallizing zone, for effecting depletion of said mother liquor by effecting under the so-maintained conditions crystallization of sodium monosulfide therefrom as aforesaid,
    (d) separating the so-crystallized sodium monosulfide from the depleted mother liquor before returning the latter to said reaction zone,
    (e) maintaining the solution in said reaction zone at temperatures sufficiently higher than said lower temperature limit to render the solution less than saturated with sodium monosufide as set forth in step (c) when restored to the concentration at which it is passed to said crystallizing zone and
    (f) while maintaining the higher temperatures referred to in step (e), restoring the volume and sodium monosulfide concentration of the solution in said reaction zone,
    (g) cooling the so-restored solution as it is being passed from said reaction zone to said crystallizing zone to temperatures sufficiently near said lower temperature limit to render the solution supersaturated with sodium monosulfide as set forth in step (c), and
    (h) passing the so-cooled solution into the crystallizing zone before the expiration of the time lag existing between the cooling past the saturation point and the commencement of deposition of crystals from the supersaturated solution.

2. The method of claim 1 wherein:
    (i) step (f) is effected in part by reacting sodium hydroxide and sodium hydrosulfide in equimolar amounts for supplying the required sodium monosulfide and a part of the volume restoring water.

3. The method of claim 2 wherein the higher temperatures referred to in step (e) are maintained partly by the exothermal reaction referred to in step (i) and partly by the application of external heat to the mother liquor.

References Cited

UNITED STATES PATENTS

| | | | |
|---|---|---|---|
| 2,252,867 | 8/1941 | Sconce et al. | 23—134 |
| 2,721,209 | 10/1955 | Dauncey et al. | 23—302 X |
| 3,262,753 | 7/1966 | Urano et al. | 23—134 |

FOREIGN PATENTS 873,233   7/1961   Great Britain.

OTHER REFERENCES

J. W. Mellor's "A Comprehensive Treatise on Inorganic and Theoretical Chemistry," vol. 2, 1922, pp. 623–626, Longmans, Green & Co., New York.

EDWARD STERN, Primary Examiner

U.S. Cl. X.R.

23—302